United States Patent [19]

Figari

[11] Patent Number: 4,784,258
[45] Date of Patent: * Nov. 15, 1988

[54] CONTACT LENS CARRYING CASE WITH MAGNIFYING AID APPARATUS

[76] Inventor: Alberto A. Figari, 99 Foxhedge Rd., Saddle River, N.J. 07458

[ * ] Notice: The portion of the term of this patent subsequent to Oct. 8, 2002 has been disclaimed.

[21] Appl. No.: 773,795

[22] Filed: Sep. 9, 1985

Related U.S. Application Data

[63] Continuation-in-part of Ser. No. 640,258, Aug. 13, 1984.

[51] Int. Cl.$^4$ .............................................. A45C 13/10
[52] U.S. Cl. ..................................... 206/5.1; 220/82 A
[58] Field of Search ......................... 206/5.1; 220/82 A

[56] References Cited

U.S. PATENT DOCUMENTS

| 1,726,314 | 8/1929 | Rose | 220/82 A |
|---|---|---|---|
| 2,413,252 | 12/1946 | Smith | 220/82 A |
| 2,948,387 | 8/1960 | Fishman | 206/5.1 |
| 2,961,108 | 11/1960 | Johnson | 220/82 A |
| 3,052,158 | 9/1962 | Sonni | 220/82 A |
| 3,089,500 | 5/1963 | Staccup | 206/5.1 |
| 3,695,280 | 10/1972 | Sturgeon | 206/5.1 |
| 3,955,726 | 5/1976 | Reitzel | 206/5.1 |
| 4,044,889 | 8/1977 | Orentreich et al. | 220/82 A |
| 4,508,216 | 4/1985 | Kelman | 206/5.1 |
| 4,545,479 | 10/1985 | Figari | 206/5.1 |

FOREIGN PATENT DOCUMENTS 2093605 9/1982 United Kingdom ................ 206/5.1

Primary Examiner—Joseph Man-Fu Moy
Attorney, Agent, or Firm—Weingram & Zall

[57] ABSTRACT

There is disclosed a contact lens carrying case which employs cylindrical right and left housing sections. The housing sections are coupled together by means of a center section which contains illuminating means for illuminating the internal hollows of the housings. Each housing has an open top and a closed bottom. The closed bottom has a magnifying lens assembly. The open top is covered by a cover member which also contains a magnifying lens assembly. Thus a contact lens which is emplaced within the hollow of the housing can be viewed in a magnified manner from either the top or the bottom due to the magnifying lens assembly. A cover from one of the housings can be employed to provide increased magnification by using the cover in conjunction with the top and bottom lenses associated with the other housing sections.

19 Claims, 1 Drawing Sheet

CONTACT LENS CARRYING CASE WITH MAGNIFYING AID APPARATUS

This is a continuation-in-part of Ser. No. 06/640,258 as originally filed on 8/13/84.

BACKGROUND OF THE INVENTION

This invention relates to a contact lens carrying case and more particularly to such a case employing top and bottom magnifiers to enable a visually handicapped person to see the contact lenses when accommodated by the case.

As is known, contact lenses are widely employed. The lenses are fabricated from a suitable plastic material which is extremely pliable and flexible. Based on the use of such lenses, the user is required to clean the lenses at frequent intervals and in doing so, the lenses are placed in a case in which they may be stored or otherwise treated during the cleaning procedure.

As is apparent, a person wearing contact lenses is visually handicapped and, after removing the lenses, would have difficulty in seeing the lenses after they have been in the case. The problem is further compounded by the fact that the lenses are clear plastic and are difficult to see under normal conditions. Hence a person with a visual handicap such as one who requires the use of such lenses will have further difficulty in viewing the lenses.

Due to the fact that the lenses are extremely fragile, oftentimes the lenses are damaged during normal wear as the plastic ruptures thereby forming small holes in the lenses or the lenses may actually tear producing a hairline opening. Furthermore, the lenses can become contaminated with dust or other particles. Hence the user of the lenses, before inserting the lens into his eye, would have to view the lens for such defects. It is, of course, apparent that a visually handicapped person would have difficulty in doing so.

It is, therefore, an object of the present invention to provide an improved carrying case which carrying case contains magnifying lens assemblies to enable a user to see the lens and to note any defects in the lenses.

It is a further object of the present invention to provide an improved carrying case for contact lenses which case includes top and bottom magnifiers and an illuminating assembly for illuminating the internal hollow of the lens accommodating housing to thereby give a user a clear and magnified view of the lens being accommodated by the housing.

BRIEF DESCRIPTION OF THE PREFERRED EMBODIMENT

A contact lens carrying case for accommodating contact lenses, said carrying case adapted to enable a user to view said lenses when accommodated by said case, comprising a right and left cylindrical housing members coupled together by means of a center section, which each of said members having an opened top and a closed bottom, with said closed bottom of said members each containing a magnifying lens to enable a user to view a contact lens emplaced within said associated cylinder member, a right and left cover member each associated with one of said right and left cylindrical housings and adapted to cover said opened top when a contact lens is emplaced within said housing with each of said cover members having a magnifying lens for viewing said contact lens, whereby said magnifying lens of said closed bottom and said magnifying lens of said cover member enable a user to view said contact lens when emplaced in said housing from either the top or the bottom and to further use said cover member lens and said closed bottom lens to obtain increased magnification when viewing said contact lens.

DETAILED DESCRIPTION OF THE FIGURES

Figure 1:
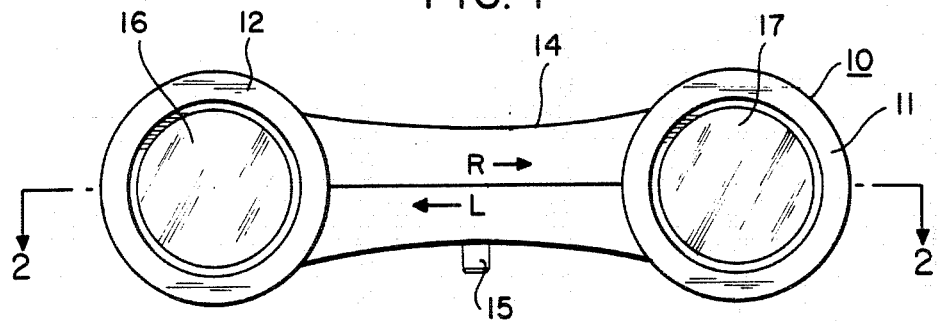
FIG. 1 is a top plan view of a contact lens carrying case according to this invention.

Referring to FIG. 1, there is shown a contact lens carrying case 10 according to this invention.

Essentially, as seen from the top view of FIG. 1, the carrying case 10 is of a conventional format and consists of a right section 11 and a left section 12. Sections 11 and 12 are cylindrical housings, each of which, as will be explained, can accommodate a right and a left contact lens. The right and left housing sections 11 and 12 are coupled together by means of a center section 14. The center section 14 has an internal hollow which contains a small battery such as the type used in wrist watches and hearing aids, and as will be explained, the battery is utilized to operate a suitable lamp assembly such as an LED device to illuminate the respective housing and, therefore, to enable a user to more clearly see the associated lenses.

Shown coupled to the center section 14 is a switch 15 which may be a push button or a two-position switch, and when activated, the switch serves to connect the battery to the lamp assembly to thereby selectively illuminate the internal hollows of the cylindrical housing 10 and 12 when accommodating a right and a left contact lens. As will be explained, each cylindrical housing member as 11 and 12 is associated with a cover or cap which cover or cap contains a magnifying lens as 16 and 17 to enable the user to utilize the magnifying lens according to his vision in order to gain a magnified view of the lens before inserting the same into his eye.

Figure 2:
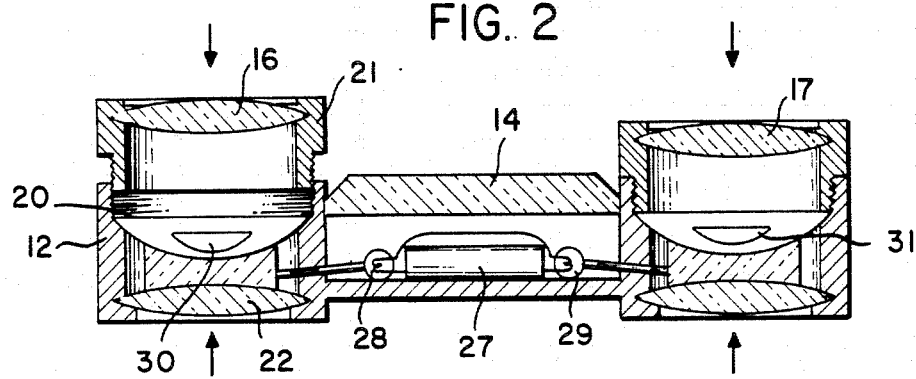
FIG. 2 is a cross sectional view taken through line 2—2 of FIG. 1.

Referring to FIG. 2, there is shown a cross sectional view taken through line 2—2 of FIG. 1.

As seen in FIG. 2, the left housing 12 is of a cylindrical configuration having an internal hollow 20 for accommodating a lens. The cylindrical housing section 12 has an open top which is threaded about its outer periphery to enable one to affix the cover 21 to the housing. The cover 21 has an internal thread which matches the outer thread 24 of the housing section as shown more clearly in FIG. 3.

As seen in FIG. 2, the bottom of the housing section 12 is closed by means of another lens 22 which interfaces with the internal hollow 20 to thus enable a user to view the lens in a magnified state from either the top or the bottom of the structure. As is well known, magnifying lenses such as 16 and 22 consists of a convergent lens or convergent system of lenses of short focal lengths. As seen in FIG. 2, the lens 16 and the lens 22 are magnifying lenses and can be fabricated by means of conventional plastics. A magnifying lens is similar to reading glasses, and it is well known in the art how to fabricate such lenses by conventional plastic forming techniques.

As one can ascertain from FIG. 2, the right and left housings are identical in configuration and are utilized to accommodate a right and a left contact lens. In order to further assist the user in determining which is the right and left lens, the housings may be differently colored as, for example, the right housing may be fabricated from an orange or other color plastic while the left housing may be fabricated from a blue or other color plastic. In this way, the user can immediately visually determine which is the right and which is the left lens without reading any indications which may be implemented upon the cover as in prior art devices.

To further enable the checking of the lenses, the center section 14 has an internal hollow which contains a battery 27 and which as indicated can be connected to a right and left lamp assembly 28 and 29. The lamps 28 and 29 will be illuminated when the switch 15 is activated and light from each lamp assembly is directed to the internal hollow of the respective housings as 20 for example. In this manner the contact lenses 30 and 31 will be illuminated upon activation of the switch 15. The magnifying lens assemblies 16 and 22 now enable the user to view the contact lenses as 30 and 31 with magnification and to thereby check the lenses for dust, holes and so on. This can be done by looking at one side of the lens via the top magnifying assembly 16 and looking at the bottom magnifying assembly 22.

Figure 3:
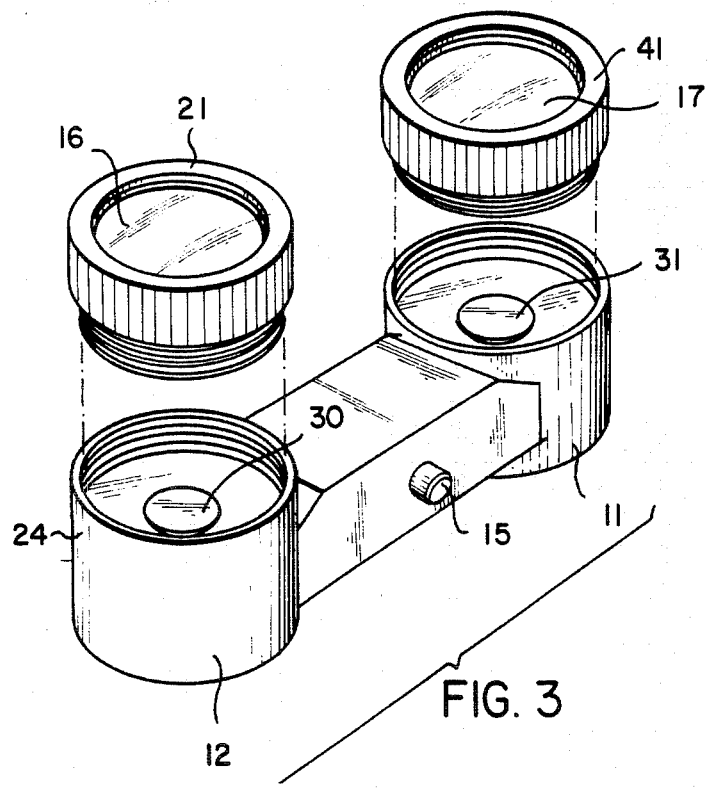
FIG. 3 is a perspective plan view of the contact lens carrying case according to this invention.

The apparatus also provides another extreme advantage. As one can ascertain, each cover as shown in FIG. 3 as 21 and 41 is associated with a magnifying lens assembly as 16 and 17. When a contact lens as 30 or 31 is being accommodated one can use the cover of the other lens to view the lens in the other housing via both lenses. For example, one can remove the cover 41 associated with the left housing and then remove the left lens 31 from the unit. By using the cover 41 to view the other lens, one now forms a microscope type of assembly. In this manner, the cover lens acts as the eye piece of the microscope while lenses 16 and 22 serve as the objective of the microscope. Hence one can now achieve an appreciable magnification and, therefore, view the entire surface of the lens 31 in a magnified mode and independent of the visual handicap of the user. As one can readily ascertain, the user can move the appropriate cover at any distance from his eye in order to obtain proper focus. Thus the concept of utilizing a top cover lens and a bottom lens in conjuction with a contact lens carrying case offers great advantages to the user of such lenses. As is clear, the lenses which are magnifying lenses can be molded or formed by plastic techniques and done so at the same time the entire housing is manufactured.

The lenses can be produced separately and then inserted into the housing as required.

Figure 4:
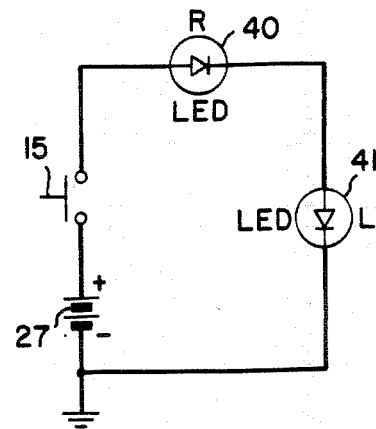
FIG. 4 is a simple schematic diagram of an illuminating circuit used with this invention.

Referring to FIG. 4, there is shown a simple electrical diagram depicting the illuminating means for the contact lens carrying case. As seen in FIG. 4, the switch 15 which may be a momentary contact switch is coupled to the battery 27. The switch 15 when activated will cause the light emitting diodes 40 and 41 to illuminate. Hence diode 40 will illuminate the right housing 12 while diode 41 will illuminate the left housing 11. The entire case 10 may be fabricated from a clear plastic to allow the optimum diffusion of light into the housings. It is, of course, apparent that a single light source such as a single LED may be employed and light can be coupled to each cavity via a plastic pipe or a fiber optic cable. Such techniques for selectively directing light are well known.

Essentially, as one can ascertain from the above, the case is associated with suitable magnifying assemblies. One assembly is positioned in the cover member while the other assembly appears at the bottom of the housing to thereby enable a user to view a lens from the top and the bottom.

The cover assembly may be further utilized to provide increased magnification by serving as an ocular lens with the cover lens or the bottom lens serving as the objective lens to enable the user to gain increased magnification. It is, of course, apparent that the shape of the case may assume many other geometrical shapes apart from the cylindrical configuration shown and may be fabricated utilizing many different materials. Thus in employing such a carrying case, a visually handicapped user will be able to view the lens to check the same for defects without the necessity of wearing a lens or using other optical aids to do so.

The use of the illuminating system further enhances the user's ability to scrutinize the lens for defects before emplacing the same into his eyes. The carrying case thus described allows the user to implement a rapid inspection of both sides of the contact lens assembly. Based on modern techniques, the entire apparatus can be fabricated from conventional plastics including the lens assemblies and can thus be manufactured very economically.

It will be further apparent that many alterations and modifications can be made without departing from the spirit and scope of the above noted invention.

It is also apparent that one may utilize the above noted concept without forming lenses in both the top of the cover and the closed bottom of the housing of the assembly.

For example, a single lens may be included in the cover as cover 21 of the contact lens carrying case or in both covers. In this manner, the bottom portion of the case should be responsive to the transmission of light. Hence the bottom portion of the case which is referred to as the closed bottom in the specification can be made from a transparent material without a lens or, in fact, can be made by having a light reflecting surface such as a mirror or other surface to enable a user to utilize the cover section as section 21 to view the lens emplaced in the bottom section with magnification.

Such an embodiment will also allow a user to view the lens in the housing. Alternatively, a magnifying lens may be emplaced solely in the closed bottom of the housing and associated with a cover as cover 21 which is completely or partially transparent or responsive to light without a magnifying lens in the cover whereby the lens may be viewed solely via the magnifying lens closed bottom of the case.

I claim:

1. A contact lens carrying case for accommodating contact lenses, said carrying case adapted to enable a user to inspect said lenses when accommodated by said case, comprising:

a right and a left lens housing member coupled together, with each of said members having an opened top and a closed bottom, and at least a portion of one of said housing members being responsive to the transmission of light;

a right and a left lens cover member each associated with one of said right and left lens housing members and adapted to cover said opened top when a contact lens is disposed within said housing with at least one of said cover members having a magnifying lens for inspecting said contact lens, whereby said magnifying lens enables a user to inspect said contact lens at an increased magnification in order to detect extraneous particles and to detect abnormalities in said lens when disposed within said associated housing.

2. The carrying case according to claim 1, wherein both of said cover members includes a magnifying lens.

3. The carrying case according to claim 1, wherein at least one closed bottom of said members further contains a magnifying lens to enable a user to inspect a contact lens from either the top or the bottom.

4. The carrying case according to claim 1, wherein both closed bottom surfaces of said members contains a magnifying lens.

5. A contact lens carrying case for accommodating contact lenses, said carrying case adapted to enable a user to inspect said lenses when accommodated by said case, comprising:
  a right and a left lens cylindrical housing coupled together by means of a central section with said cylindrical housings having an opened top and a closed bottom with at least one bottom of one cylindrical housing closed by a magnifying lens to enable a user to inspect a contact lens when emplaced in said one housing by inspecting said contact lens at an increased magnification in order to detect extraneous particles and to detect abnormalities in said lens via said magnifying lens;
  a right and a left lens cover member each of a cylindrical configuration and having a closed top and an opened bottom for positioning each cover member over the opened top of said cylindrical housing.

6. The carrying case according to claim 5, further including at least one magnifying lens in one of said cover members.

7. The contact lens carrying case according to claim 5, wherein both tops of said cover members are closed by an associated magnifying lens whereby said associated housing when accommodating said cover member enables a user to inspect a contact lens accommodated by said housing with magnification.

8. A contact lens carrying case for accommodating contact lenses, said carrying case having right and left housing sections for accommodating a right and a left lens with each housing section associated with a cover member to enclose said housing when a lens is emplaced therein, in combination therewith the apparatus for enabling a user to inspect said lens with magnification when said lens is disposed within said housing, comprising:
  at least one magnifying lens integrally associated with a corresponding housing section to enable a user to inspect said lens when emplaced in said section and covered by said cover at an increased magnification in order to detect extraneous particles and to detect abnormalities in said lens.

9. The carrying case according to claim 8, wherein said lens is integrally formed in at least one of said cover members.

10. The carrying case according to claim 8, wherein said lens is integrally formed in at least one of said housing sections.

11. The carrying case according to claim 8, wherein said housing sections are fabricated from a light conductive plastic.

12. The carrying case according to claim 8, wherein said cover members are fabricated from a light conductive plastic.

13. The carrying case according to claim 8, wherein both of said cover members have a magnifying lens integrally formed in the closed top.

14. The carrying case according to claim 8, wherein each of said housing sections have an associated lens integrally formed on a surface to enable a user to view a contact lens emplaced in either housing section with magnification.

15. The carrying case according to claim 5, wherein at least a portion of one of said cover members is responsive to the transmission of light.

16. The carrying case according to claim 5, wherein at least a portion of one of said housings is responsive of the transmission of light.

17. A contact lens carrying case for accommodating contact lenses, said carrying case adapted to enable a user to inspect said lenses when accommodated by said case, comprising:
  a right and a left lens housing member coupled together, with each of said members having an opened top and a closed bottom;
  a right lens and a left lens cover member each associated with one of said right and left lens housing members and adapted to cover said opened top when a contact lens is emplaced within said housing with at least one of said lens cover members having a magnifying lens for inspecting said contact lens, whereby said magnifying lens enables a user to inspect said contact lens at an increased magnification in order to detect extraneous particles and to detect abnormalities in said lens when disposed within said associated housing.

18. A carrying case according to claim 17, wherein the magnification at which said lens is inspected may be varied by adjusting the distance between said lens cover member and a contact lens.

19. A carrying case according to claim 17, further comprising a threaded means on said cover and said housing to enable adjustment of the distance between a lens member and a contact lens.

* * * * *